United States Patent [19]

Ijntema

[11] Patent Number: 4,556,695

[45] Date of Patent: Dec. 3, 1985

[54] PROCESS FOR THE DEGRADATION OF (CO)POLYMERS OF PROPYLENE

[75] Inventor: Klaas Ijntema, Dieren, Netherlands

[73] Assignee: Akzo N.V., Arnhem, Netherlands

[21] Appl. No.: 624,282

[22] Filed: Jun. 25, 1984

[30] Foreign Application Priority Data

Jul. 11, 1983 [NL] Netherlands ............... 8302462

[51] Int. Cl.$^4$ ................................... C08F 8/50
[52] U.S. Cl. .......................... 525/359.6; 525/333.7
[58] Field of Search ..................... 525/359.6, 333.7

[56] References Cited

U.S. PATENT DOCUMENTS 3,922,256 11/1975 Locke et al. ............... 528/359.6

FOREIGN PATENT DOCUMENTS 78149601 7/1979 Japan.
1475618 6/1977 United Kingdom.

Primary Examiner—Joseph L. Schofer
Assistant Examiner—Bernard Lipman
Attorney, Agent, or Firm—Parkhurst & Oliff

[57] ABSTRACT

A process for the degradation of (co)polymers using as degradants chlorinated 1,1,2,2-tetramethyl-1,2-diphenyl ethane (chlorinated bicumyl) and/or derivatives thereof carrying alkyl substituents in the aromatic nuclei. The present degradants generally are mixtures of bicumyls having varying degrees of chlorination. They may be employed in combination with usual antioxidants and/or UV-stabilizers and display higher activity than bicumyl itself.

4 Claims, No Drawings

PROCESS FOR THE DEGRADATION OF (CO)POLYMERS OF PROPYLENE

The present invention relates to the degradation of (co)polymers of propylene in the absence of an organic bromine compound. A process of this type is disclosed in Japanese Patent Application 79-90291, which proposes as degradant for polypropylene the use of 1,1,2,2-tetramethyl-1,2-diphenyl ethane (bicumyl).

The need for degrading (co)polymers of propylene is due to the fact that for uses which require them to be readily processable, as in the melt spinning at very high shear rates of multifilament yarns and of fibres for nonwovens, these (co)polymers, which are prepared by the Ziegler-Natta process, have an unduly high molecular weight and hence a prohibitively high viscosity to be directly processed into fibres, films or other shaped articles. Heating the (co)polymers at a temperature in the range of 200° to 350° C. in the presence of a radical initiator results in a reduction of the molecular weight and a narrower distribution of the molecular weight. The (co)polymers thus degraded satisfy the requirements of ease of processability and suitability for the above-mentioned and other uses.

The present invention relates to a process of the type indicated above which is carried out in the presence of a compound of the formula

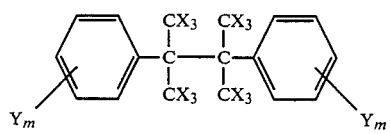

and/or

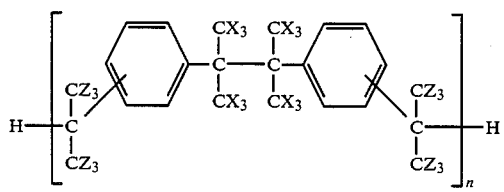

wherein 1 to 3 of the groups X and 1 to 3 of the groups Z represent chlorine atoms and the remaining groups X and Z represent hydrogen atoms, Y is a substituted or unsubstituted alkyl group having 1–4 carbon atoms, $m=0-4$ and $n=2-1000$. It has been found that these compounds have a considerably higher degradant activity than the bicumyl disclosed in the above-mentioned Japanese patent application.

It should be added that British Patent Specification No. 1 475 618 discloses the use as synergist in polypropylene of chlorinated bicumyl in combination with flame retardant organic bromine compounds. The present process relates to controlled degradation of (co)polymers. This treatment takes place in the absence of a flame retardant amount of organic bromine compounds [i.e. an amount generally of 1 to 15% by weight, calculated on the (co)polymer]. As the heating causes the compounds envisaged completely to disintegrate into radicals, they would not contribute to the flame retardancy of the final (co)polymer in any case.

The process according to the invention is to be applied to (co)polymers obtained by the Ziegler-Natta process, and more particularly to polypropylene, copolymers of ethylene and propylene, propylene and butene-1 and propylene and 1-hexene, polypropylene being the most widely applied. Degradation may be carried out in a known manner. To that end the (co)polymer is heated in the presence of the present compound to a temperature above the melting point of the (co)polymer and above the decomposition temperature of the radical initiator. This temperature will generally be in the range of 200° to 350° C., preferably between 220° and 300° C. Heating is usually conducted for 0.1 to 30 minutes, preferably for 0.5 to 10 minutes. Heating may be performed in any common compounding apparatus, such as an extruder in which the temperature can be raised to the desired level.

If the present compound contains several chlorine atoms, they are in general preferably attached to various carbon atoms. It is preferred that the compounds should contain in all 1 to 2 chlorine atoms in the positions denoted by X and by Z. For the compounds of the formula II of course average values are envisaged.

With the present compound I Y is a substituted or unsubstituted alkyl group having 1 to 4 carbon atoms. Examples thereof include methyl, monochloromethyl, ethyl, monochloroethyl, isopropyl, monochloroisopropyl and tertiary butyl. The value of m is 0–4, more particularly 0–2 and preferably 0.

The present compounds of the formula I and their method of preparation are described in British patent specification No. 1 475 618.

For instance, a compound of the above formula, wherein $X=H$, dissolved in an organic solvent is reacted with chlorine in the presence of a catalytic amount of iodine and/or with ultraviolet radiation after which the resulting compound is isolated. In general, suitable organic solvents are those that are also used in other well-known chlorination reactions, for example, benzene and carbon tetrachloride. A man skilled in the art will have no difficulty in the light of his knowledge of corresponding chlorination reactions, in determining the optimum amounts of iodine and radiation to be used in this process.

Another attractive process for preparing the novel compounds of the invention comprises reacting a compound of the above formula, where $X=H$, dissolved in an organic solvent with sulphuryl chloride in the presence of an organic peroxide and subsequently isolating the resulting compound. Preferably an organic peroxide such as an acyl peroxide, more particularly benzoyl peroxide, is used, but also other peroxides may be used. Isolation and purification of the compounds prepared by the above processes preferably take place by evaporation of the solvent and, if required, of other volatile constituents.

With compounds of the formula II n should be 2–1000, and preferably 4–500. Chlorination will generally result in obtaining mixtures of different chlorinated bicumyl compounds. The use of these mixtures in the present process does not give any problems.

Generally, 0.001 to 1 percent by weight, preferably 0.01 to 0.2 percent by weight, calculated on the amount of (co)polymer, of the radical initiator will be added to the (co)polymer to be degraded.

Besides, the usual amounts of one or more antioxidants and/or U.V.-stabilizers may be added to the mixture to be heated. Suitable antioxidants are esters of β-(3,5-di-tert. butyl-4,4-hydroxyphenyl)-propionic acid, more particularly the esters thereof with pentaerythrite octadecanol, 1,3,5-trimethyl-2,4,6-tris(3',5'-di-tert. butyl-4'-hydroxyphenyl)-benzene, 4-hydroxymethyl-2,6-di-tert. butyl phenol, tris-(2'-methyl-4'-hydroxy-5'-tert. butyl phenyl)-butane, tetrakis[3-(3,5-di-tert. butyl-4-hydroxyphenyl)propionyloxymethyl]methane, 2,6-di-tert. butyl-p-cresol and 3,5-dimethyl-4-hydroxybenzyl thioglycolic acid stearyl ester.

Suitable U.V.-stabilizers are 2-(2'-hydroxy-3'-5'-di-tert. amylphenyl)-benzotriazole, 2-(2'-hydroxy-3'-5'-di-tert. butylphenyl)-5- chlorobenzotriazole and 2-hydroxy-4n-octyl-oxy-benzophenone.

The following example serves to illustrate the present invention.

EXAMPLE

In accordance with the procedure described in Example 1 of GB 1,475,618 use was made of bicumyl for the preparation of five chlorinated bicumyl compositions (A, B, C, D and E). To the reaction mixture different amounts of sulphuryl chloride were added.

The compositions were tested in polypropylene (Stamylan P 13 E 10, of DSM) having a melt viscosity of 225 Pa.s at a shear rate of $10^3 S^{-1}$. The polypropylene contained 0.1% by weight of pentaerythritol tetra kis[3-(3,5-di-tert.butyl-4-hydroxyphenyl)-propionate] and 0.1% by weight of 2,6-di-tert.-butyl-p-cresol (antioxidant).

A solution of the degradant in acetone was applied to the polypropylene pellets, followed by drying for 1 hour at 40° C. in vacuo. The pellets were subsequently compression moulded into thin films about 200 μ thick (3 minutes at 190° C., 18 tons/cm²). Next, the films were cut up into small bits, which were successively mixed and compression moulded into plates 3 mm thick (18 /tons/cm² at 220° C. and 280° C.). The compression times were 5 and 15 minutes. After they had been cooled, the plates were cut into test specimens of dimensions suitable for filling a Göttfert Rheometer. Subsequently, the apparent melt viscosity was determined in a known way at 190° C. in a Göttfert capillary melt viscosimeter (shear rate $10^3 S^{-1}$; capillary length 40 mm, capillary diameter 1 mm). The decrease of the melt viscosity thus determined is a measure of the degrading activity of the radical initiator. The results are shown in the table below.

TABLE

| Type | degradant Cl (wt. %) | monochloro bicumyl (wt. %) | dichloro bicumyl (wt. %) | wt. % degr. in comp. | Melt viscosity (Pas, $10^3 s^{-1}$) 220° C. | | 280° C. | |
|---|---|---|---|---|---|---|---|---|
| | | | | | 5 min | 15 min | 5 min | 15 min |
| — | — | — | — | — | 222 | 208 | 219 | 190 |
| bi-cumyl | — | — | — | 0.05 | 218 | 218 | 152 | 98 |
| | | | | 0.1 | 218 | 218 | 152 | 98 |
| A | 13.9 | 88.3 | 6.2 | 0.05 | 201 | 179 | 61 | 47 |
| | | | | 0.1 | 192 | 156 | 33 | 25 |
| B | 15.5 | 54.8 | 40.1 | 0.05 | 197 | 145 | 56 | 56 |
| | | | | 0.1 | 171 | 130 | 37 | 27 |
| C | 18.6 | 28.4 | 65.3 | 0.05 | 165 | 140 | 93 | 82 |
| | | | | 0.1 | 155 | 116 | 33 | 17 |
| D | 23.1 | <0.1 | 95.1 | 0.05 | 167 | 122 | 32 | 32 |
| | | | | 0.1 | 143 | 78 | 22 | 11 |
| E | 30.0 | | | 0.05 | 183 | 165 | 112 | 91 |
| | | | | 0.1 | 190 | 153 | 75 | 57 |

I claim:

1. A process for the degradation of polymers or copolymers of polypropylene, comprising carrying out said degradation in the absence of a flame retardant amount of an organic bromine compound and in the presence of a compound of the formula

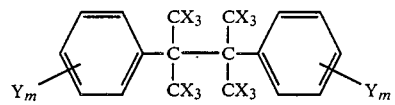

wherein X represents a chlorine atom or a hydrogen atom with the proviso that the compound contains 1 to 3 chlorine atoms, Y is an unsubstituted alkyl group having 1 to 4 carbon atoms and m=0-4.

2. A process according to claim 1, wherein the compound contains 1 to 2 chlorine atoms.

3. A process according to claim 1, wherein m=0.

4. A process according to claim 1, wherein the degradation is carried out in the additional presence of at least one of an anti-oxidant and a stabilizing agent.

* * * * *